United States Patent
Bravo et al.

(10) Patent No.: US 11,989,359 B1
(45) Date of Patent: May 21, 2024

(54) VIRTUALIZATION OF DIGITAL CROWN ACTIONS BASED ON ACTIONS PERFORMED WITH AN ELECTRONIC PEN

(71) Applicant: Kyndryl, Inc., New York, NY (US)

(72) Inventors: Cesar Bravo, Alajuela (CR); Edgar Adolfo Zamora Duran, Heredia (CR); Desilda Toska, San Rafael (CR); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/158,486

(22) Filed: Jan. 24, 2023

(51) Int. Cl.
| | |
|---|---|
| G06F 3/0354 | (2013.01) |
| G04G 9/00 | (2006.01) |
| G04G 21/08 | (2010.01) |
| G06F 3/01 | (2006.01) |
| G06F 3/0362 | (2013.01) |
| G06F 3/038 | (2013.01) |
| G06F 3/14 | (2006.01) |
| G06F 3/0346 | (2013.01) |

(52) U.S. Cl.
CPC ......... *G06F 3/03545* (2013.01); *G04G 9/007* (2013.01); *G04G 21/08* (2013.01); *G06F 3/017* (2013.01); *G06F 3/0362* (2013.01); *G06F 3/038* (2013.01); *G06F 3/1454* (2013.01); *G06F 3/0346* (2013.01)

(58) Field of Classification Search
CPC .................................................. G06F 3/03545
USPC ....................................................... 345/179
See application file for complete search history.

(56) References Cited

U.S. PATENT DOCUMENTS

| | | | |
|---|---|---|---|
| 9,823,742 B2 | 11/2017 | Parker et al. | |
| 10,739,866 B2 | 8/2020 | Bostick et al. | |
| 2005/0024346 A1 | 2/2005 | Dupraz et al. | |
| 2016/0054821 A1* | 2/2016 | Kim | G06F 3/0442 345/179 |
| 2020/0328614 A1* | 10/2020 | Jackson | H04B 5/0037 |
| 2021/0232303 A1 | 7/2021 | Poupyrev et al. | |
| 2023/0020913 A1* | 1/2023 | Yoon | G06F 3/1454 |

FOREIGN PATENT DOCUMENTS

| | | |
|---|---|---|
| WO | 2015127167 A1 | 8/2015 |
| WO | 2022184250 A1 | 9/2022 |

OTHER PUBLICATIONS

Anonymous, "Method and System for Conditional Device Pairing and Contect Sharing with Electronic Pen," IP.com Prior Art Database Technical Disclosure, IPCOM000268418D, Jan. 30, 2022, 4 pages.

(Continued)

*Primary Examiner* — Long D Pham
(74) *Attorney, Agent, or Firm* — CANTOR COLBURN LLP; Dan Housley (57) ABSTRACT

Embodiments relate to virtualization of digital crown actions based on actions performed with an electronic pen. A technique includes communicatively coupling a smartwatch to an electronic pen, the smartwatch including a rotatable piece, where the rotatable piece controls a plurality of functionalities of the smartwatch. The technique includes receiving data from the electronic pen, and in response to receiving the data from the electronic pen, controlling at least one of the plurality of functionalities.

22 Claims, 8 Drawing Sheets

(56) References Cited

OTHER PUBLICATIONS

Anonyous, "IBM patents smartwatch that folds out into a smartphone and tablet," URL: https://www.designboom.com/technology/IBM-folding-smartwatch-patent-07-10-2019/; Retrieved: Dec. 27, 2022; 12 pages.
Liszewski, "IBM Patents a Smartwatch That Transforms Into a Giant Awkward Tablet Screen on your Wrist," GIZMODO, Jul. 9, 2019, 14 pages.
Lorenzetti, "IBM's Watson makes its health care debut on the Apple Watch," Fortune, Oct. 26, 2015, 9 pages.
Meek, "This is the craziest smartwatch design you've ever seen, and it's not from Apple or Samsung," BGR, Jul. 8, 2019, 9 pages.
Moskvitch, "How the world's first smartwatch inspired cutting-edge AI," IBM Research Blog, Jan. 19, 2021, 6 pages.
Song et al., "Grips and Gestures on a Multi-Touch Pen," Proceedings of the SIGCHI on Human Factors in Computing Systems, May 2011, pp. 1323-1332.

\* cited by examiner

COMMUNICATIVELY COUPLE A SMARTWATCH TO AN ELECTRONIC PEN, THE SMARTWATCH COMPRISING A ROTATABLE PIECE, WHEREIN THE ROTATABLE PIECE CONTROLS A PLURALITY OF FUNCTIONALITIES OF THE SMARTWATCH 602

RECEIVE DATA FROM THE ELECTRONIC PEN 604

IN RESPONSE TO RECEIVING THE DATA FROM THE ELECTRONIC PEN, CONTROL AT LEAST ONE OF THE PLURALITY OF FUNCTIONALITIES 606

VIRTUALIZATION OF DIGITAL CROWN ACTIONS BASED ON ACTIONS PERFORMED WITH AN ELECTRONIC PEN

BACKGROUND

The present invention generally relates to computer systems, and more specifically, to computer-implemented methods, computer systems, and computer program products configured and arranged to provide virtualization of digital crown actions based on actions performed with an electronic pen.

A smartwatch is a wearable computer in the form of a watch. Modern smartwatches provide a local touchscreen interface for daily use, while an associated smartphone application provides for management and telemetry, such as long-term biomonitoring. Although a watch can perform basic tasks, such as calculations, digital time telling, translations, and game-playing, newer smartwatches have more general functionality closer to smartphones, including mobile applications, a mobile operating system, Wi-Fi® connectivity, and Bluetooth® connectivity. Some smartwatches function as portable media players, with radio and playback of digital audio and video files via a Bluetooth® headset. Some models, called watch phones (or phone watches), have mobile cellular functionality like making calls.

SUMMARY

Embodiments of the present invention are directed to computer-implemented methods for virtualization of digital crown actions based on actions performed with an electronic pen. A non-limiting computer-implemented method includes communicatively coupling a smartwatch to an electronic pen, the smartwatch including a rotatable piece, where the rotatable piece controls a plurality of functionalities of the smartwatch. The computer-implemented method includes receiving data from the electronic pen. The computer-implemented method includes, in response to receiving the data from the electronic pen, controlling at least one of the plurality of functionalities.

According to one or more embodiments, a non-limiting computer-implemented method includes receiving, by a smartwatch, a notification. The computer-implemented method includes, in response to receiving the notification, determining, by the smartwatch, that an electronic pen is active. The computer-implemented method includes communicatively connecting, by the smartwatch, to the electronic pen, the smartwatch including a rotatable piece that controls a plurality of functionalities of the smartwatch. The computer-implemented method includes in response to receiving a confirmation from a user of the smartwatch, assigning, by the smartwatch, the electronic pen as an input device for controlling at least one of the plurality of functionalities.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments provide virtualization of digital crown actions based on actions performed with an electronic pen. While using an electronic pen to interact with a display device, if the user wishes to interact with smartwatch content of a smartwatch, the user can rotate the electronic pen as per the desired functionality, such that the rotation of the electronic pen corresponds to the same interaction with a digital crown of the smartwatch. Accordingly, the user does not have to release the electronic pen to interact with the smartwatch, thereby allowing the movements of the electronic pen to generate the same functionalities of the digital crown of the smartwatch.

For a smartwatch, the digital crown is an input device. The user can rotate the digital crown while navigating smartwatch content. Based on the rotation of the digital crown, the user can select any menu, zoom in or out, scroll the smartwatch content, etc. The electronic pen is popular because the electronic pen can be utilized to interact with a display device, such as a tablet, notebook, laptop, etc. While using with electronic pen to interact with the display device, if the user wishes to interact with his/her smartwatch, for example, because of a notification, etc., the user has to leave the electronic pen and then proceed with his/her hand to interact with the digital crown of the smartwatch or interact with the display screen of the smartwatch. This interrupts use of the electronic pen.

Even if the user was interacting with the display device, one or more embodiments allow the user to continue using the electronic pen to perform digital crown actions based on actions performed with the electronic pen. Therefore, while using the electronic pen to interact with the display device, the user does not have to discontinue use of the electronic pen when operating the smartwatch according to one or more embodiments.

Technical solutions and benefits include a system that transfers digital crown capabilities to an electronic pen. Particularly, the system provides electronic pen capabilities to a smartwatch when the electronic pen is detected to be in use and the smartwatch requires user intervention, for example, as a result of a notification, response, etc. One or more embodiments provide a three-way connectivity system, as a temporal ecosystem including the smartwatch, the electronic pen, and the digital display, when the user is using the electronic pen. Some embodiments may not have these potential benefits or advantages, and these potential benefits or advantages are not necessarily required of all embodiments.

Figure 1:
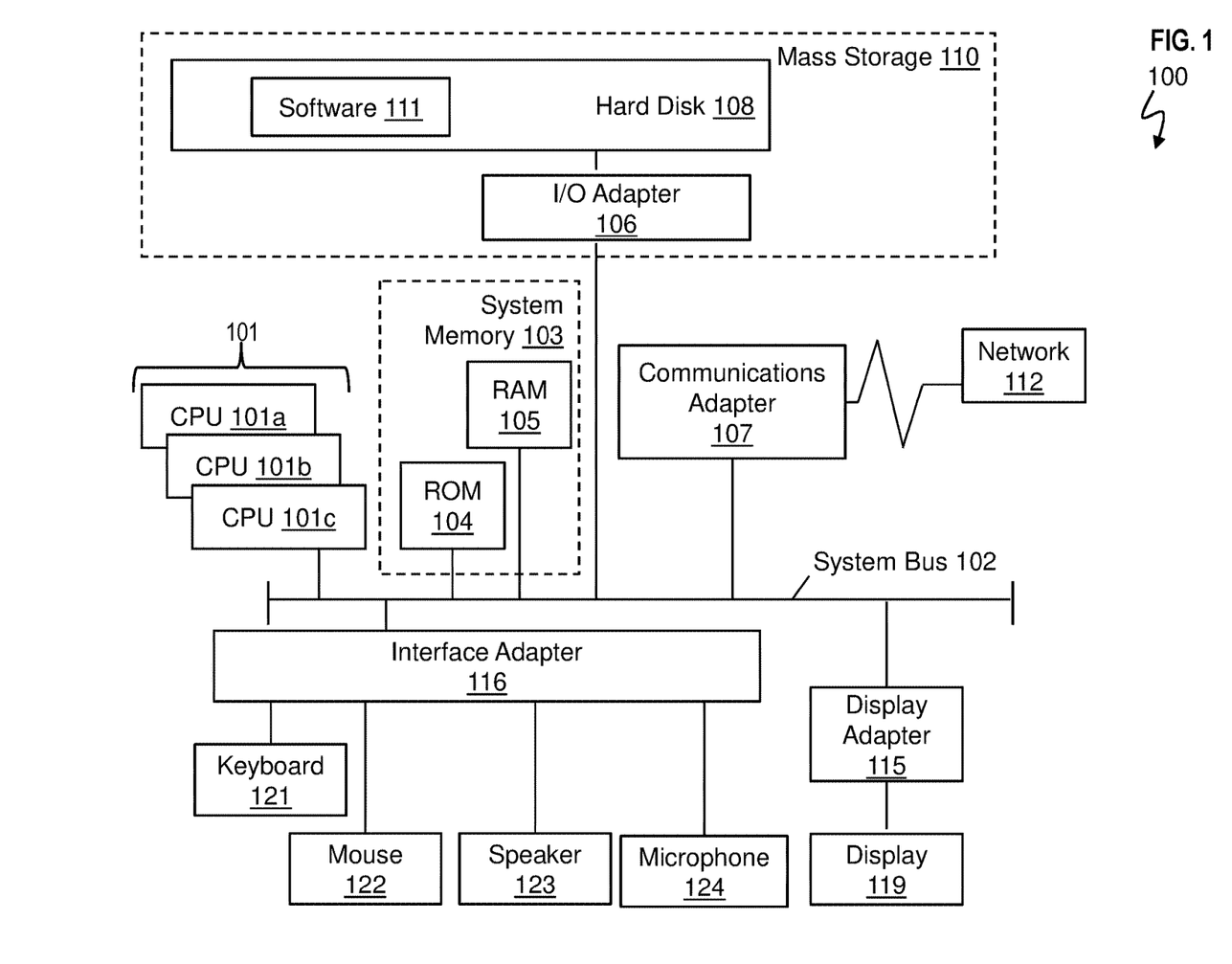
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
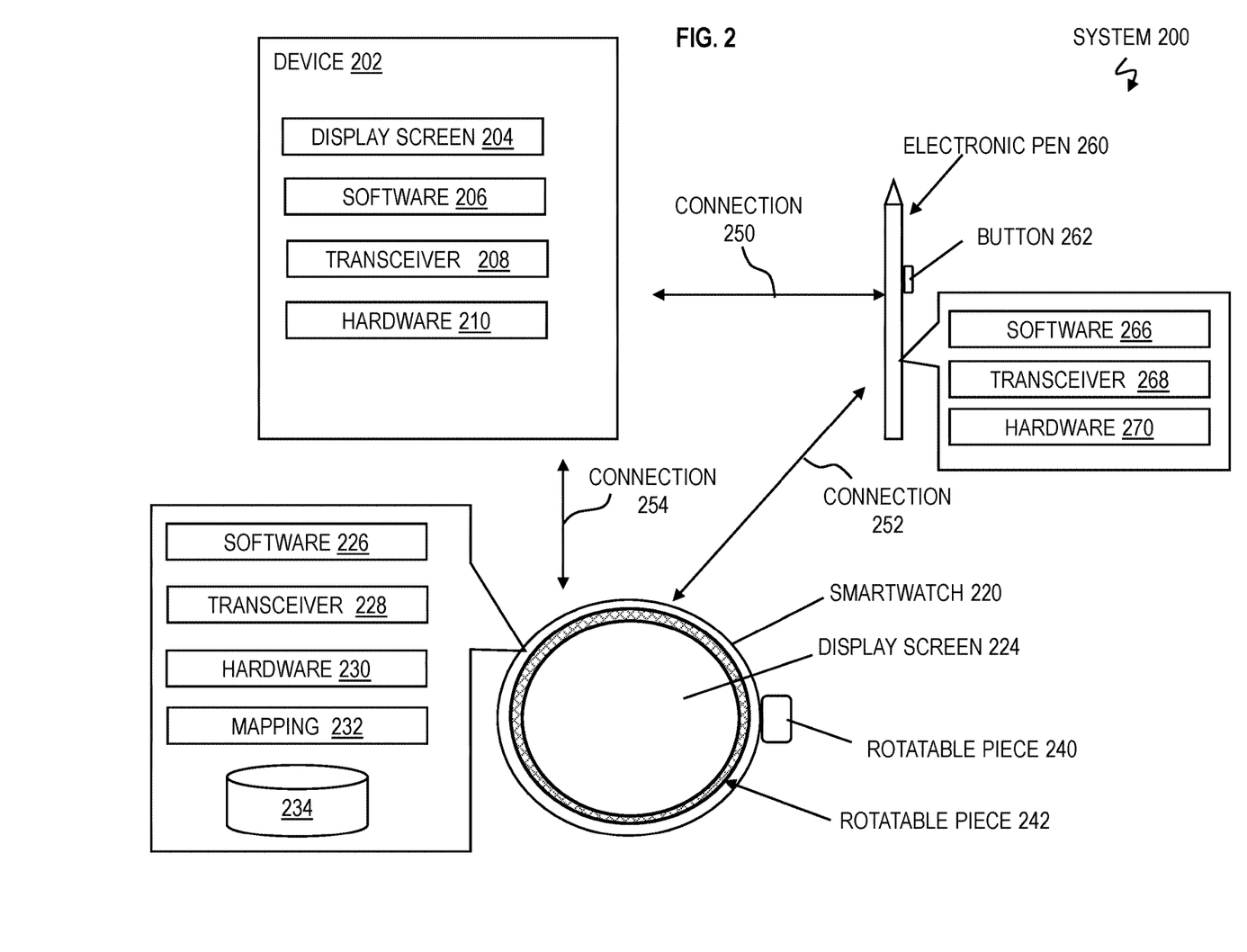
FIG. 2 depicts a block diagram of an example system configured to provide virtualization of digital crown actions based on actions performed with an electronic pen according to one or more embodiments of the present invention.

FIG. 2 depicts a block diagram of an example system 200 configured to provide virtualization of digital crown actions based on actions performed with an electronic pen according to one or more embodiments. In the system 200, a device 202 can be representative of a tablet, an electronic/digital notebook, a laptop, and/or any type of computer system that can wirelessly connect to an electronic pen 260 over a wireless communication connection 250. A smartwatch 220 can wirelessly connect to the electronic pen 260 over a wireless communication connection 252. The smartwatch 220 can wirelessly connect to the device 202 over a wireless communication connection 254. The device 202, electronic pen 260, and smartwatch 220 can include any of the functionality discussed in computer system 100 including various software applications such as software 111 which can be executed as instructions on one or more processors 101 in order to perform actions according to one or more embodiments of the invention.

The device 202 includes a display screen 204, software 206, a transceiver 208, and hardware 210, such that the device 202 can operate as, for example, a digital tablet as understood by one of ordinary skill in the art. The electronic pen 260 includes a button 262, software 266, a transceiver 268, and hardware 270, such that the electronic pen 260 is configured to operate as an electronic pen as understood by one or ordinary skill in the art.

The electronic pen 260 can also be referred to as a smart pen, digital pen, active pen, etc. The electronic pen is an input device that captures the handwriting or strokes of a user and converts handwritten analog information into digital data, enabling the data to be utilized in various applications. The electronic pen is usually used in conjunction with a digital notebook or tablet, although the data can also be used for different applications or simply as a graphic. The electronic pen can also have features like voice recording or a text scanner. Electronic pens contain internal electronics and have features such as touch sensitivity, input buttons, memory for storing movements including handwriting data and gestures, and transmission capabilities. The electronic pen captures the handwriting data, which can be digitized, uploaded to a computer, and displayed on a screen. The electronic pen can include an inertia mass unit (IMU) (e.g., microelectromechanical sensors (MEMS)), accelerometers, gyroscopes, etc.) which are used to detect movements of the pen in the X, Y, and Z axes, such that the movements of the pen can be mapped to widgets being displayed on the display of the smart watch, tablet, etc. The electronic pen may also measure polar coordinates.

The smartwatch 220 includes a display screen 224 and a rotatable piece 240. The rotatable piece 240 may also be referred to as a digital crown, a knob, etc. Additionally, or alternatively, the smartwatch 220 can include a rotatable piece 242 around the display screen 224. The rotatable piece 242 may be referred to as a rotatable bezel on a smartwatch. According to one or more embodiments, some smartwatches may have the rotatable piece 240, while other smartwatches may have the rotatable piece 242. As discussed herein, the rotatable piece 240 and/or the rotatable piece 242 are input devices. The user can rotate the rotatable piece 240 (e.g., digital crown) and/or the rotatable piece 242 (e.g., rotatable bezel) while navigating smartwatch content. Based on the rotation of the rotatable piece 240 and/or rotatable piece 242, the user can select any menu, zoom in and out, scroll the smartwatch content, etc. The rotatable piece 240 and the rotatable piece 242 can control various functionalities of the smartwatch 220 as understood by one of ordinary skill in the art. In some example scenarios, the rotatable piece 240 may be described. It should be appreciated that discussion of the rotatable piece 240 applies by analogy to the rotatable piece 242.

The smartwatch 220 includes software 226, a transceiver 228, and hardware 230. The transceiver 228 of the smartwatch 220 can connect to the transceiver 268 of the electronic pen 260 via the wireless connection 252. The wireless connection 252 along with the wireless connections 250, 254 can include near-field communication (NFC) connections, Bluetooth® connections, a Bluetooth® low energy (BLE) connections, and/or any other wireless connections and protocols. It should be appreciated that the device 202, the electronic pen 260, and the smartwatch 220 can be paired using any known technology and can recognize each other using device recognition software.

As noted above, actions made by a user on the rotatable pieces 240, 242 control various functionalities of the smartwatch 220. The rotatable pieces 240, 242 can be rotated, pressed (e.g., pushed in one or more times, pushed and held, etc.), etc. The smartwatch 220 includes a mapping table 232 configured to map predefined actions or movements of the electronic pen 260 to corresponding actions of the rotatable pieces 240, 242 in order to execute the same functionalities. The electronic pen 260 can perform actions like the actions performed by rotatable piece 240 (e.g., digital crown) and/or rotatable piece 242 (e.g., rotatable bezel) including rotation, direction of rotation, tapping, changing angular position, etc. Additionally, the user can also rotate the electronic pen 260 along the polar axis, change the direction of rotation, apply pressure, change the tilting angle, etc. Examples of functionalities/capabilities (for the rotatable piece 240 (e.g., digital crown) and/or rotatable piece 242 (e.g., rotatable bezel)) that can also be executed by the electronic pen 260 may include any of the following: volume up, volume down, dismiss alert, snooze alert, accept call, dismiss call, send automatic response, skip song, play song, select application (app), switch between apps, switch to home screen, etc.

Figure 3A:
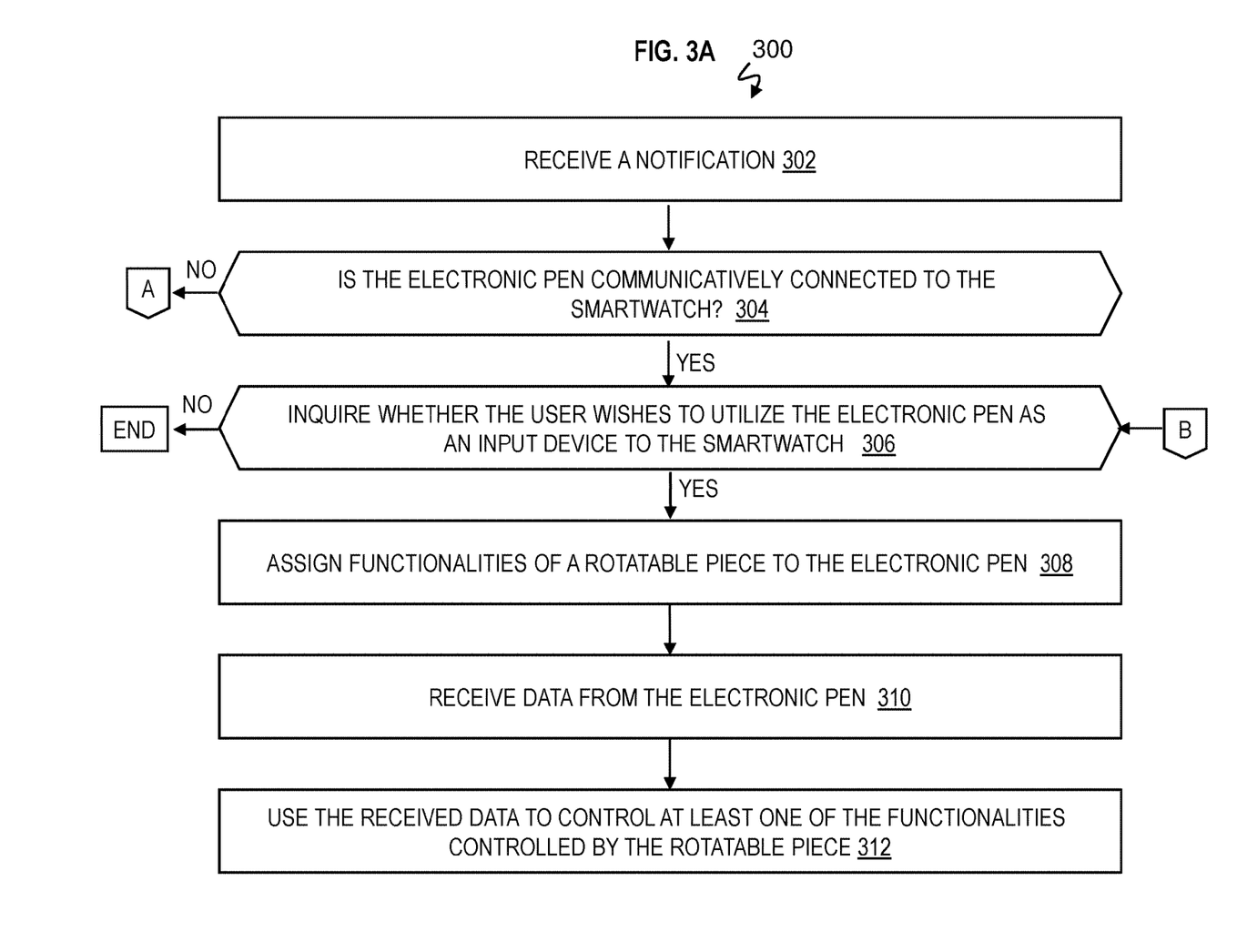
FIGS. 3A and 3B are a flowchart of a computer-implemented method for virtualization of digital crown actions based on actions performed with an electronic pen according to one or more embodiments of the present invention.
Figure 3B:
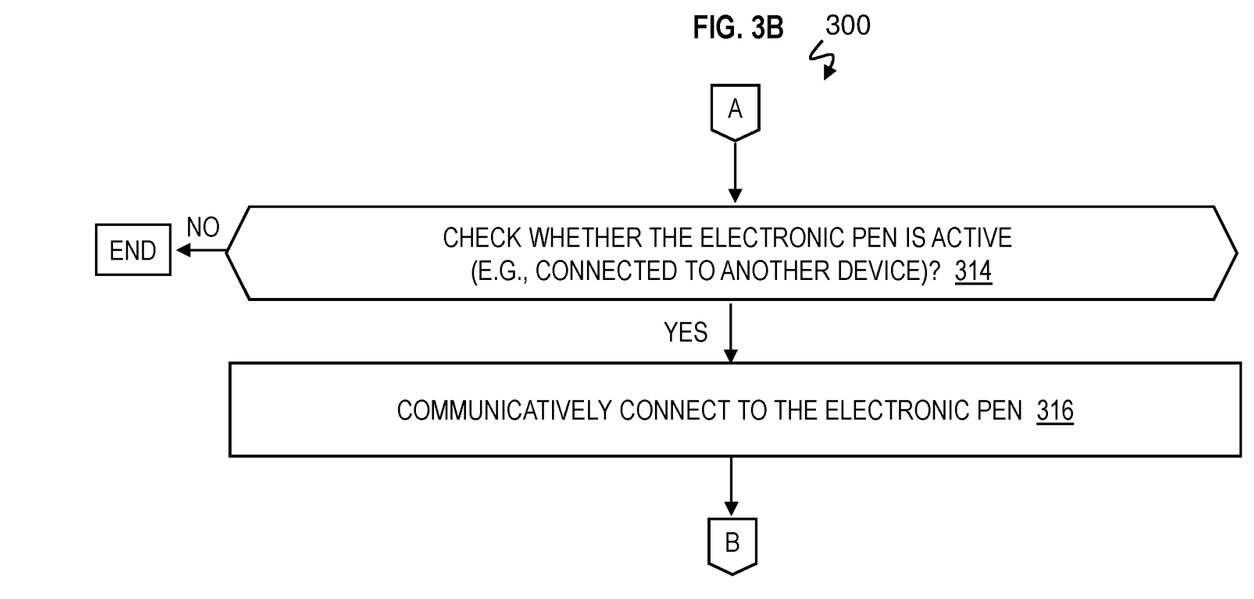

FIGS. 3A and 3B are a flowchart of a computer-implemented method 300 for virtualization of digital crown actions based on actions performed with an electronic pen according to one or more embodiments. The computer-implemented method 300 is executed by the smartwatch 220. The software 226 can include, be integrated with, and/or call various other pieces of software, algorithms, application programming interfaces (APIs), etc., to operate as discussed herein.

At block 302, the software 226 of the smartwatch 220 is configured to receive a notification that could be an alert, response, etc. The notification or alert could be for an incoming message, a call, a reminder, an alarm, etc. The notification or alert could be for media including video, audio, images, etc. The notification or alert could be for news, social media, sports, weather, any type of feed, etc. The notification received by the smartwatch 220 requires user input.

At block 304, the software 226 of the smartwatch 220 is configured to check whether the electronic pen 260 is communicatively connected to the smartwatch 220. If (No) the smartwatch 220 is not currently connected to the electronic pen 260, flow proceeds to block 316.

At block 306, if (Yes) the smartwatch 220 is communicatively connected to the electronic pen 260 via the wireless connection 252, the software 226 of the smartwatch 220 is configured to inquire whether the user wishes to utilize the electronic pen 260 as a wireless input device to the smartwatch 220. Particularly, the smartwatch 220 can ask the user (e.g., via the speaker, a vibration, text, etc.) if the user wishes to leverage the electronic pen as an input device. The smartwatch 220 may ask the user for voice confirmation, ask the user to perform a given action with the electronic pen (assuming the electronic pen 260 is wirelessly connected to the smartwatch 220), and/or ask the user to write a word (for example, write the word "OK" if you want to use the electronic pen as input or write a dot if you want to use this electronic pen as input). If the user responds with a negative (No) answer, the flow ends. In one or more embodiments, the smartwatch 220 may automatically determine that the user wishes to use the electronic pen 260 as an input device based on past responses by the user stored in the user profile 234.

At block 308, if the user responds with a positive (Yes) answer, the software 226 of the smartwatch 220 is configured to assign functionalities of the rotatable piece 240, 242 to the electronic pen. If not already established, the smartwatch 220 establishes the wireless connection 252 with the electronic pen 260 and assigns input functionalities (including digital crown capabilities and bezel capabilities) to the electronic pen 260.

At block 310, the software 226 of the smartwatch 220 is configured to receive data from the electronic pen 260 in which the data corresponds to the actions/movements of the electronic pen 260. The data may include X, Y, Z coordinates, rotational measurements (e.g., in degrees))(°, etc., that define the actions/movements of the pen made the user, as well as an indication that the button 262 has been pressed or selected. The software 226 uses the mapping table 232 to map the predefined actions/movements of the electronic pen 260 to corresponding functionalities of the smartwatch 220. The functionalities correspond to the actions of the rotatable pieces 240, 242. Moreover, the specific interactions of the electronic pen 260 are mapped to and associated with smartwatch device functionalities, such that the smartwatch 220 is controlled by the electronic pen 260.

At block 312, the software 226 of the smartwatch 220 is configured to use the received data from the electronic pen 260 to control one or more of the functionalities controlled by the rotatable pieces 240, 242. In one or more embodiments, the software 226 may automatically permit the electronic pen 260 to control one or more of the functionalities controlled by the rotatable pieces 240, 242 once the software 226 determines that the smartwatch 220 is wireless connected to the electronic pen 260. The data (including X, Y, and Z values as accelerometer data) from the electronic pen 260 may be associated with controlling one an application on the smartwatch 220, such as a messaging application, a music application, a video application, etc. Additionally, the software 226 is configured to translate manual writing using the electronic pen 260 as input, so that the user can physically write using the electronic pen 260 to respond to messages.

At block 314, the software 226 of the smartwatch 220 is configured to check whether the electronic pen 260 is active, for example, communicating (or paired) with another device such as the device 202. For example, via the transceiver 228, the software 226 can detect accelerometer data when the electronic pen 260 is in use, thereby recognizing that the electronic pen is active. The software 226 can include and/or call device recognition software to determine that the electronic pen 260 is active. If (No) the electronic pen 260 is not currently active, the flow ends.

At block 316, if (Yes) the electronic pen 260 is active, the software 226 of the smartwatch 220 is configured to communicatively connect to the electronic pen 260 via the wireless connection 252, and flow proceeds to block 306.

Figure 4:
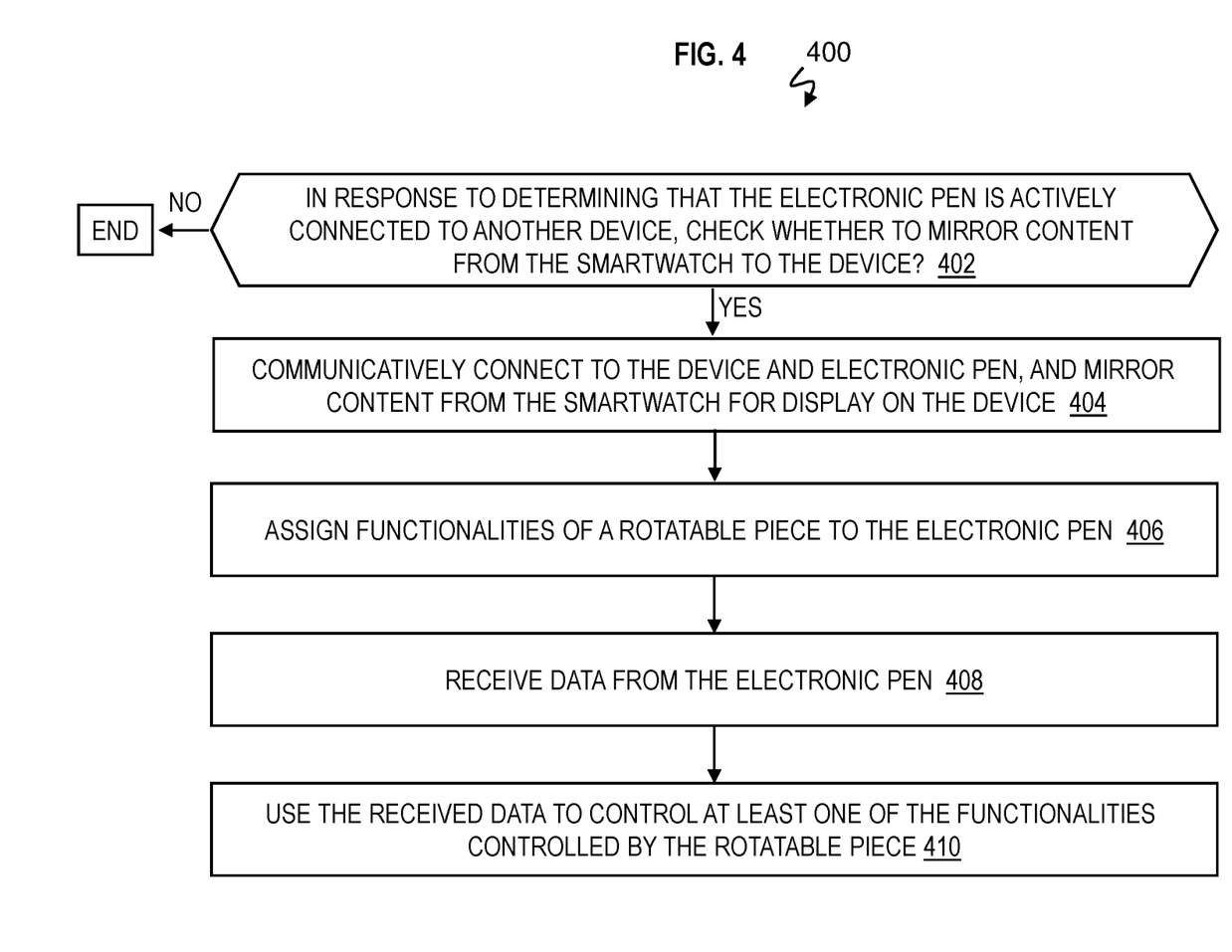
FIG. 4 is flowchart of a computer-implemented method for virtualization of digital crown actions based on actions performed with the electronic pen and mirroring content to a device according to one or more embodiments of the present invention.

FIG. 4 is flowchart of a computer-implemented method 400 for virtualization of digital crown actions based on actions performed with the electronic pen and mirroring smartwatch content to the device 202 according to one or more embodiments. FIG. 4 may be integrated with one or more blocks in FIGS. 3A and 3B.

At block 402, the software 226 of the smartwatch 220 is configured to, in response to determining that the electronic pen 260 is actively connected to another device such as the device 202, check whether to mirror smartwatch content (e.g., displayed on the display screen 224) from the smartwatch 220 to the device 202. If the user responds with a negative (No) answer, the flow ends. At block 404, if the user responds with a positive (Yes) answer, the software 226 of the smartwatch 220 is configured to communicatively connect to the electronic pen 260 via the wireless connection 252 and to the device 202 via the wireless connection 254, and mirror smartwatch content from the smartwatch 220 to the device 202. The smartwatch 220 can transmit the smartwatch content to the device 202 over the wireless connection 254.

Blocks 406, 408, and 410 in FIG. 4 respectively correspond to block 308, 310, and 312 in FIG. 3A. At blocks 406, 408, and 410, the software 226 of the smartwatch 220 is configured to assign functionalities of the rotatable piece 240, 242 to the electronic pen, receive data from the electronic pen 260 in which the data corresponds to the actions/movements of the electronic pen 260, and use the received data from the electronic pen 260 to control one or more of the functionalities controlled by the rotatable pieces 240, 242.

Figure 5:
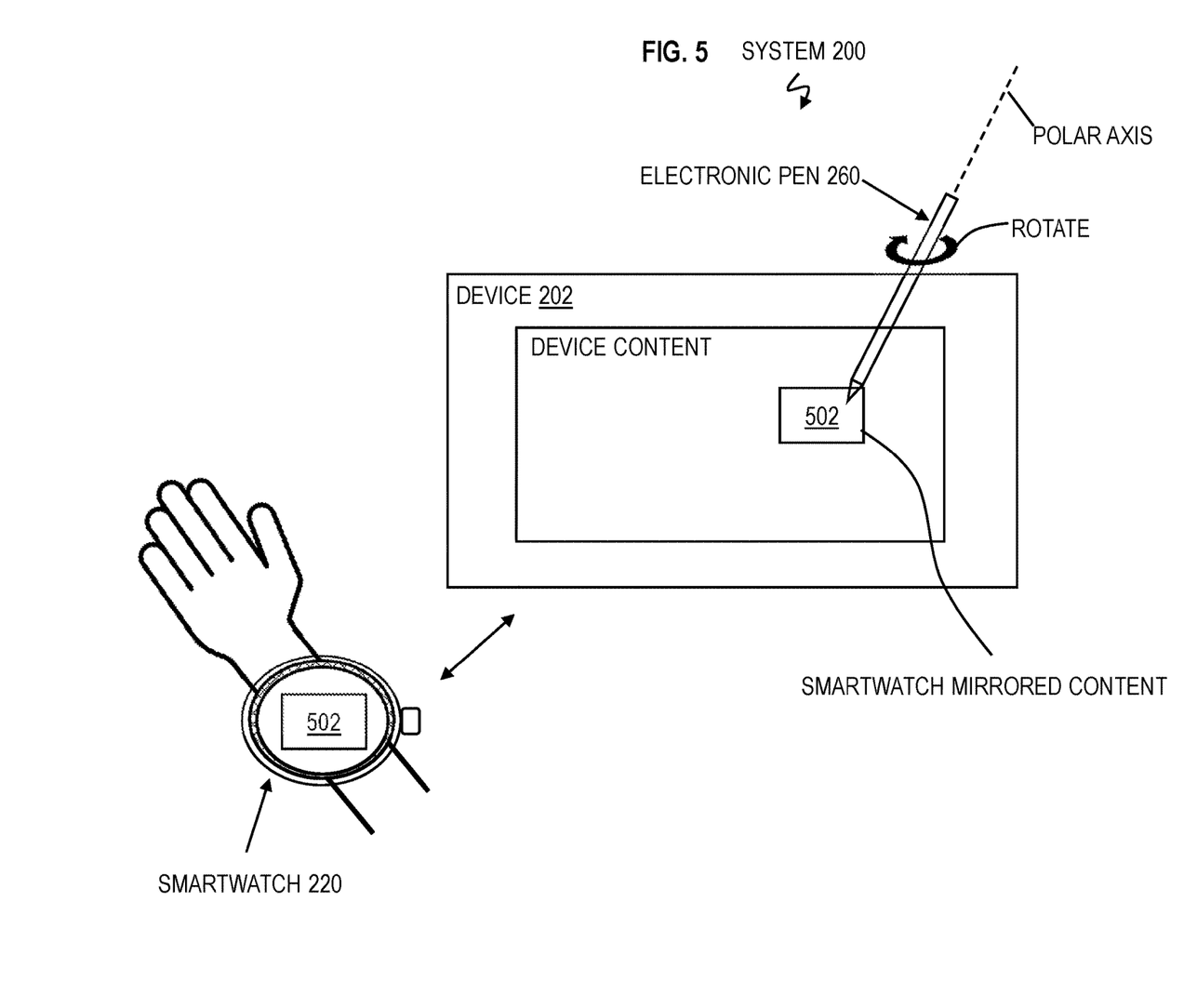
FIG. 5 depicts a block diagram of the system further illustrating that smartwatch content displayed on the smartwatch is mirrored on a display screen of another device according to one or more embodiments of the present invention.

FIG. 5 is a block diagram of the system 200 further detailing that smartwatch content 502 displayed on the display screen 224 is mirrored on the display screen 204 of the device 202. Although the system 200 in FIG. 5 omits some details in FIG. 2 so as not to obscure the figure, it is understood that these details are meant to be included in FIG. 5. As seen in FIG. 5, the user can view the smartwatch content 502 and use the electronic pen 260 to control the functionalities of the smartwatch 220 without the user having to take his/her eyes from the display screen 204 of the device 202 (e.g., tablet).

An example scenario is considered in which the user is engaged with device content on the device 202 (e.g., a tablet) to write, and the software 226 enables the mirroring of the smartwatch content 502 on the display screen 224 of the smartwatch 220 such that the user can use digital crown commands executed with his/her electronic pen 260. Accordingly, the user does not have to switch his/her focus from the display screen 204 of the device 202 to the smartwatch 220. Any known technology can be utilized for mirroring such as Google Cast®, Miracast®, etc., as understood by one of ordinary skill in the art. This means that the smartwatch content is overlaid over device content on the display screen. In this way, the user's interaction with electronic pen is executed on the smartwatch 220 and displayed as the smartwatch content 502 on the display screen 224 of the device 202. As seen in FIG. 5, the user can rotate the electronic pen 260 to control the functionalities of the smartwatch 220, such as the functionalities associated with the rotatable piece 240 (e.g., digital crown) and/or rotatable piece 242 (e.g., rotatable bezel).

In one or more embodiments, the software 226 can record historical user data in the user profile 234 about interactions with the smartwatch 220 and other devices 202 to identify the scenario when the user changes his/her focus, such as when viewing biometric data, viewing any phone call notification, etc. This historical user data is used by the software 226 to predict future scenarios to automatically activate the electronic pen 260 as input for the smartwatch 220 and enable digital crown functionalities for the electronic pen 260. Activating the electronic pen 260 may include establishing the wireless connection 252. The software 226 can include rules-based conditions to perform this prediction.

Further, when the software 226 predicts the user will be looking at the smartwatch 220, then software 226 transmits the smartwatch content 502 displayed on the smartwatch 220 to the device 202 such that the smartwatch content 502 is overlaid on the device content on the display screen 204 of the device 202. To navigate to the displayed smartwatch content 502 overlaid on the display screen 204, the user can perform appropriate movements to the electronic pen 260, change the holding angle, apply pressure, select the button 262, etc. Based on the user's interaction with the electronic pen 260, the software 226 correspondingly changes the displayed content 502 on the smartwatch 220, where in this case the electronic pen 260 performs the actions of the digital crown. The software 226 correspondingly sends updates to the smartwatch content 502 displayed on the device 202, in response to any actions of the user made with the electronic pen 260.

Software 226 of the smartwatch 220 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the software 226 described herein can be a combination of hardware and programming. The programming can be processor executable instructions stored on a tangible memory, and the hardware can include processing circuitry for executing those instructions. Alternatively, or additionally, one or more portions of the software 226 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 6:
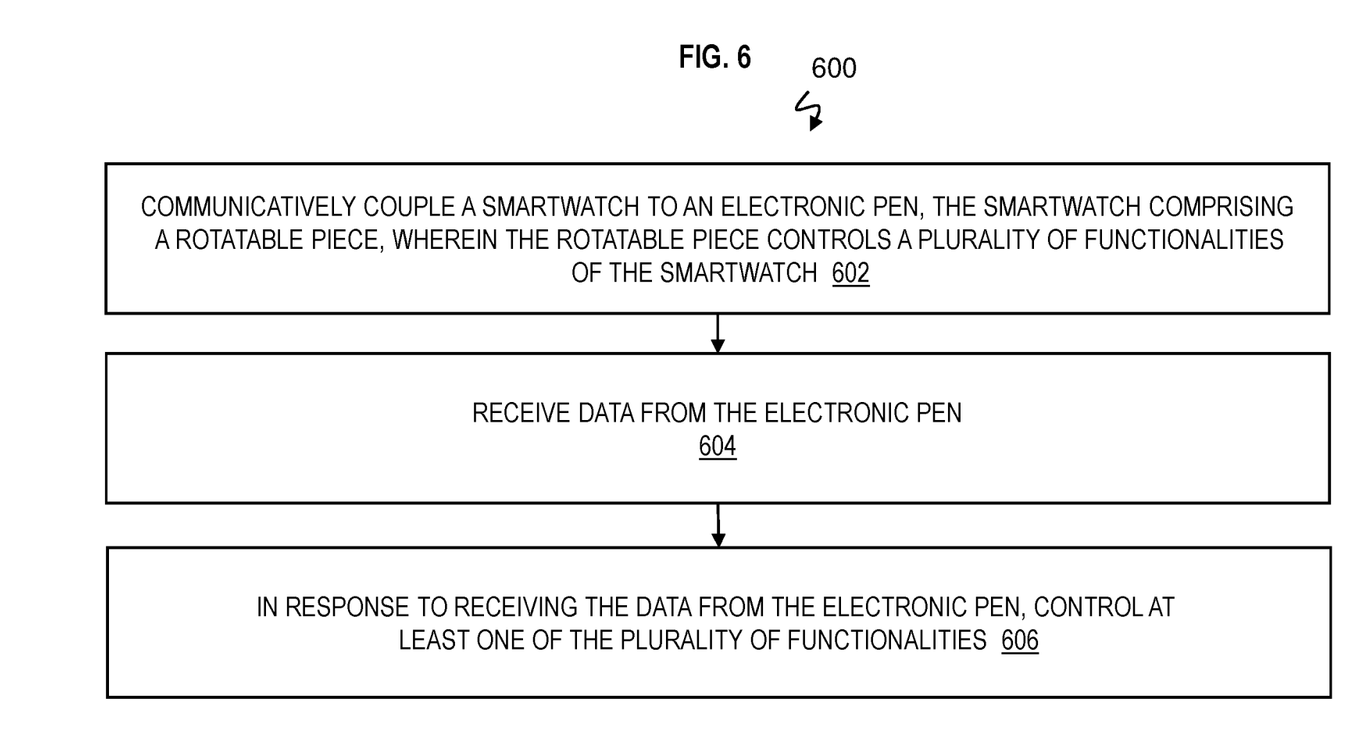
FIG. 6 is a flowchart of a computer-implemented method for virtualization of digital crown actions based on actions performed with an electronic pen in order to control a smartwatch according to one or more embodiments of the present invention.

FIG. 6 is a flowchart of a computer-implemented method 600 for virtualization of digital crown actions based on actions performed with an electronic pen in order to control a smartwatch according to one or more embodiments. Reference can be made to any of the figures discussed herein. The computer-implemented method 600 can be performed by the software 226 of the smartwatch 220.

At block 602, the software 226 is configured to communicatively couple the smartwatch 220 to the electronic pen 260, the smartwatch 220 including a rotatable piece (e.g., rotatable piece 240 and/or rotatable piece 242), where the rotatable piece controls a plurality of functionalities of the smartwatch 220. At block 604, the software 226 is configured to receiving data from the electronic pen 260. At block 606, the software 226 is configured to, in response to receiving the data from the electronic pen 260, control at least one of the plurality of functionalities.

Movement of the electronic pen 260 is mapped to correspond to movement of and/or human interface with the rotatable piece (e.g., rotatable piece 240 and/or rotatable piece 242). In response to the electronic pen 260 being rotated, an action is initiated on the smartwatch 220. The communicatively coupling of the smartwatch to the electronic pen is in response to determining that the electronic pen is coupled to a device 202. The controlling of the at least one of the plurality of functionalities is in response to an indication of a confirmation for use of the electronic pen 260. The method includes determining that the electronic pen is being used with a device 202 and causing a mirrored content 502 of the smartwatch to be overlayed on a display screen 204 of the device 202. A transmission (from the smartwatch 220) is sent to the device 202 in order to cause an update to the mirrored content 502 on the display screen 204, in response to the data from the electronic pen 260. Although the electronic pen 260 can be utilized with the device 202, the electronic pen 260 can stand alone and is not required to operate with the device 202. Particularly, the electronic pen 260 can operate directly with the smartwatch 220 via the wireless connection 252 without requiring any other device.

Figure 7:
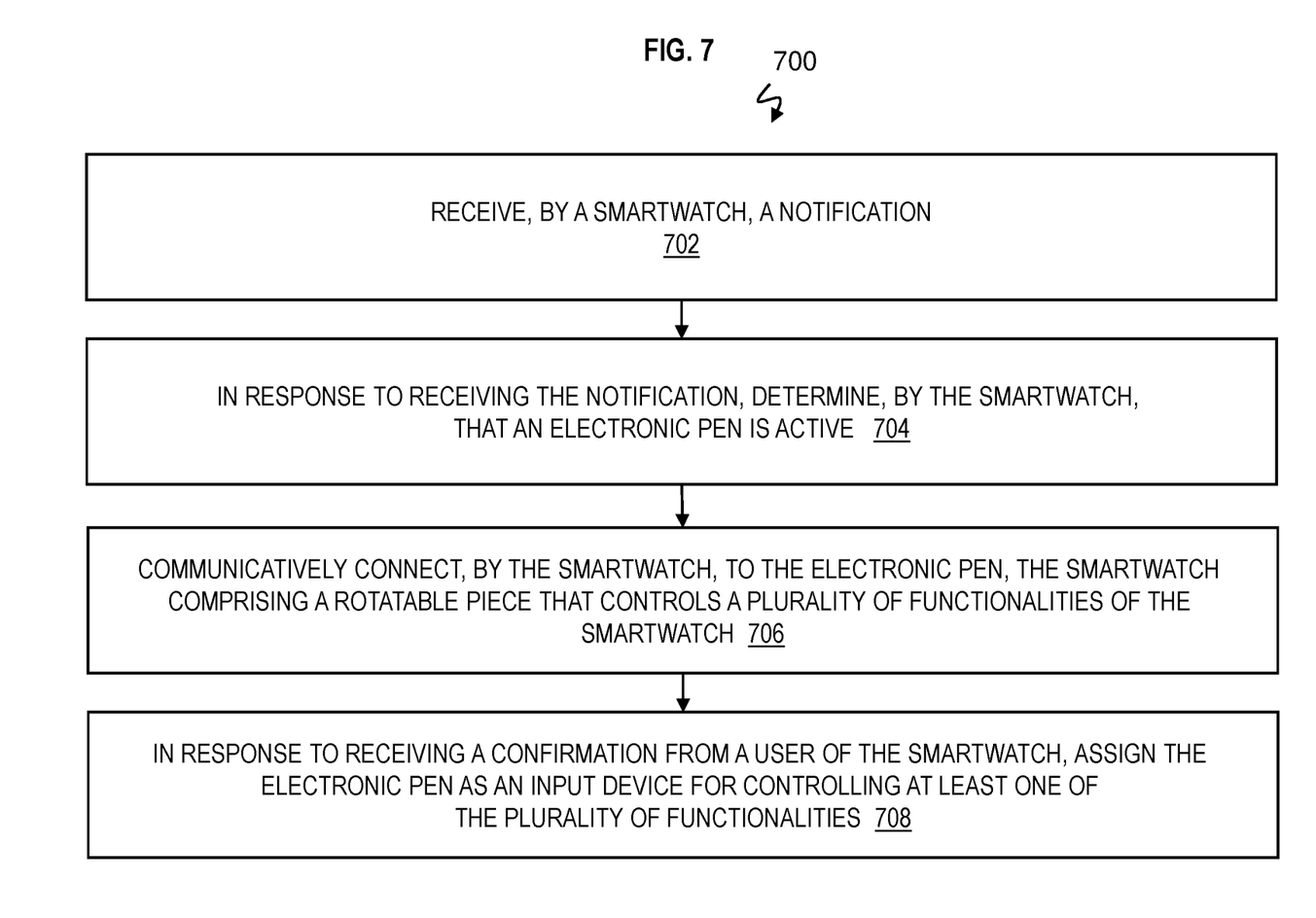
FIG. 7 is a flowchart of a computer-implemented method for virtualization of digital crown actions based on actions performed with an electronic pen in order to control a smartwatch according to one or more embodiments of the present invention.

FIG. 7 is a flowchart of a computer-implemented method 700 for virtualization of digital crown actions based on actions performed with an electronic pen in order to control a smartwatch according to one or more embodiments. Reference can be made to any of the figures discussed herein. The computer-implemented method 700 can be performed by the software 226 of the smartwatch 220.

At block 702, the software 226 of the smartwatch 220 is configured to receive a notification. At block 704, the software 226 of the smartwatch 220 is configured to, in response to receiving the notification, determine that an electronic pen 260 is active. At block 706, the software 226 of the smartwatch 220 is configured to communicatively connect to the electronic pen 260, the smartwatch 220 including a rotatable piece (e.g., rotatable piece 240 and/or rotatable piece 242) that controls a plurality of functionalities of the smartwatch 220. At block 708, the software 226 of the smartwatch 220 is configured to, in response to receiving a confirmation (e.g., "Yes" or affirmative response) from a user of the smartwatch 220, assign the electronic pen 260 as an input device for controlling at least one of the plurality of functionalities.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
communicatively coupling a smartwatch to an electronic pen, the smartwatch comprising a rotatable piece, wherein the rotatable piece controls a plurality of functionalities of the smartwatch;
receiving data from the electronic pen; and
in response to receiving the data from the electronic pen, controlling at least one of the plurality of functionalities, wherein a transmission is sent to a device in order to cause an update to mirrored content on a display screen of the device, in response to the data from the electronic pen.

2. The computer-implemented method of claim 1, wherein movement of the electronic pen is mapped to correspond to interfacing with the rotatable piece.

3. The computer-implemented method of claim 1, wherein in response to the electronic pen being rotated, an action is initiated on the smartwatch.

4. The computer-implemented method of claim 1, wherein the communicatively coupling of the smartwatch to the electronic pen is in response to determining that the electronic pen is coupled to a device.

5. The computer-implemented method of claim 1, wherein the controlling of the at least one of the plurality of functionalities is in response to an indication of a confirmation for use of the electronic pen.

6. The computer-implemented method of claim 1, further comprising determining that the electronic pen is being used with the device; and
causing the mirrored content of the smartwatch to be overlayed on the display screen of the device.

7. A smartwatch comprising:
a memory having computer readable instructions; and
one or more processors for executing the computer readable instructions, the computer readable instructions controlling the one or more processors to perform operations comprising:
communicatively coupling the smartwatch to an electronic pen, the smartwatch comprising a rotatable piece, wherein the rotatable piece controls a plurality of functionalities of the smartwatch;
receiving data from the electronic pen; and in response to receiving the data from the electronic pen, controlling at least one of the plurality of functionalities, wherein a transmission is sent to a device in order to cause an update to mirrored content on a display screen of the device, in response to the data from the electronic pen.

8. The smartwatch of claim 7, wherein movement of the electronic pen is mapped to correspond to interfacing with the rotatable piece.

9. The smartwatch of claim 7, wherein in response to the electronic pen being rotated, an action is initiated on the smartwatch.

10. The smartwatch of claim 7, wherein the communicatively coupling of the smartwatch to the electronic pen is in response to determining that the electronic pen is coupled to a device.

11. The smartwatch of claim 7, wherein the controlling of the at least one of the plurality of functionalities is in response to an indication of a confirmation for use of the electronic pen.

12. The smartwatch of claim 7, wherein the one or more processors perform operations further comprising determining that the electronic pen is being used with the device; and
 causing the mirrored content of the smartwatch to be overlayed on the display screen of the device.

13. A computer program product comprising a computer readable storage medium having program instructions embodied therewith, the program instructions executable by one or more processors to cause the one or more processors to perform operations comprising:
 communicatively coupling a smartwatch to an electronic pen, the smartwatch comprising a rotatable piece, wherein the rotatable piece controls a plurality of functionalities of the smartwatch;
 receiving data from the electronic pen; and
 in response to receiving the data from the electronic pen, controlling via the electronic pen at least one of the plurality of functionalities of the rotatable piece of the smartwatch, the rotatable piece being separate from the electronic pen, wherein a transmission is sent to a device in order to cause an update to mirrored content on a display screen of the device, in response to the data from the electronic pen.

14. The computer program product of claim 13, wherein movement of the electronic pen is mapped to correspond to interfacing with the rotatable piece.

15. The computer program product of claim 13, wherein in response to the electronic pen being rotated, an action is initiated on the smartwatch.

16. The computer program product of claim 13, wherein the communicatively coupling of the smartwatch to the electronic pen is in response to determining that the electronic pen is coupled to a device.

17. The computer program product of claim 13, wherein the controlling of the at least one of the plurality of functionalities is in response to an indication of a confirmation for use of the electronic pen.

18. The computer program product of claim 13, wherein the one or more processors perform operations further comprising determining that the electronic pen is being used with the device; and
 causing the mirrored content of the smartwatch to be overlayed on the display screen of the device.

19. A computer-implemented method comprising:
 receiving, by a smartwatch, a notification;
 in response to receiving the notification, determining, by the smartwatch, that an electronic pen is active;
 communicatively connecting, by the smartwatch, to the electronic pen, the smartwatch comprising a rotatable piece that controls a plurality of functionalities of the smartwatch; and
 in response to receiving a confirmation from a user of the smartwatch, assigning, by the smartwatch, the electronic pen as an input device for controlling at least one of the plurality of functionalities, wherein a transmission is sent to a device in order to cause an update to mirrored content on a display screen of the device, in response to the data from the electronic pen.

20. The computer-implemented method of claim 19, wherein:
 movement of the electronic pen is mapped to correspond to interfacing with the rotatable piece; and
 in response to the electronic pen being rotated, an action is initiated on the smartwatch.

21. The computer-implemented method of claim 19, wherein the determining, by the smartwatch, that the electronic pen is active is based on the smartwatch recognizing a connection between the electronic pen and a device.

22. A watch comprising:
 a memory having computer readable instructions; and
 one or more processors for executing the computer readable instructions, the computer readable instructions controlling the one or more processors to perform operations comprising:
  receiving a notification;
  in response to receiving the notification, determining that an electronic pen is active;
  communicatively connecting to the electronic pen, the watch further comprising a rotatable piece that controls a plurality of functionalities of the watch; and
  in response to receiving a confirmation from a user of the watch, assigning the electronic pen as an input device for controlling at least one of the plurality of functionalities, wherein a transmission is sent to a device in order to cause an update to mirrored content on a display screen of the device, in response to the data from the electronic pen.

* * * * *